July 21, 1925.

A. G. REESE

CLUTCH

Filed March 14, 1921    2 Sheets-Sheet 1

1,546,674

July 21, 1925.                                                          1,546,674
A. G. REESE
CLUTCH
Filed March 14, 1921            2 Sheets-Sheet 2

Inventor.
Arthur G. Reese
by Thurston &c. + Hudson
Attys

Patented July 21, 1925.

1,546,674

UNITED STATES PATENT OFFICE.

ARTHUR G. REESE, OF CLEVELAND, OHIO, ASSIGNOR TO THE WELLMAN-SEAVER-MORGAN COMPANY, OF CLEVELAND, OHIO, A CORPORATION OF OHIO.

CLUTCH.

Application filed March 14, 1921. Serial No. 452,141.

*To all whom it may concern:*

Be it known that I, ARTHUR G. REESE, a citizen of the United States, residing at Cleveland, in the county of Cuyahoga and State of Ohio, have invented a certain new and useful Improvement in Clutches, of which the following is a full, clear, and exact description.

This invention relates to friction clutches and has particular utility in connection with heavy duty machinery such as mine hoists having drums requiring for their control large and powerful clutches.

One of the principal objects of the invention is to provide a clutch having high efficiency and having the features of simplicity of construction, ease of assembly, and consisting of relatively few parts compared with clutches heretofore employed of equal capacity.

Further the invention aims to provide a clutch which can be readily adjusted, and which is so constructed that the parts through which adjustment is made are accessible.

Still further the invention aims to provide an improved clutch having a plurality of sets of toggle mechanisms which float on the outer rings of the clutch and are supported wholly independently of the inner clutch ring or spider, this construction eliminating the necessity for exactness in construction, and materially reducing the time and labor, and therefore, the cost of assembling.

The invention may be briefly summarized as consisting in certain novel details of construction, and combinations and arrangements of parts which will be described in the specification and set forth in the appended claims.

Figure 1:
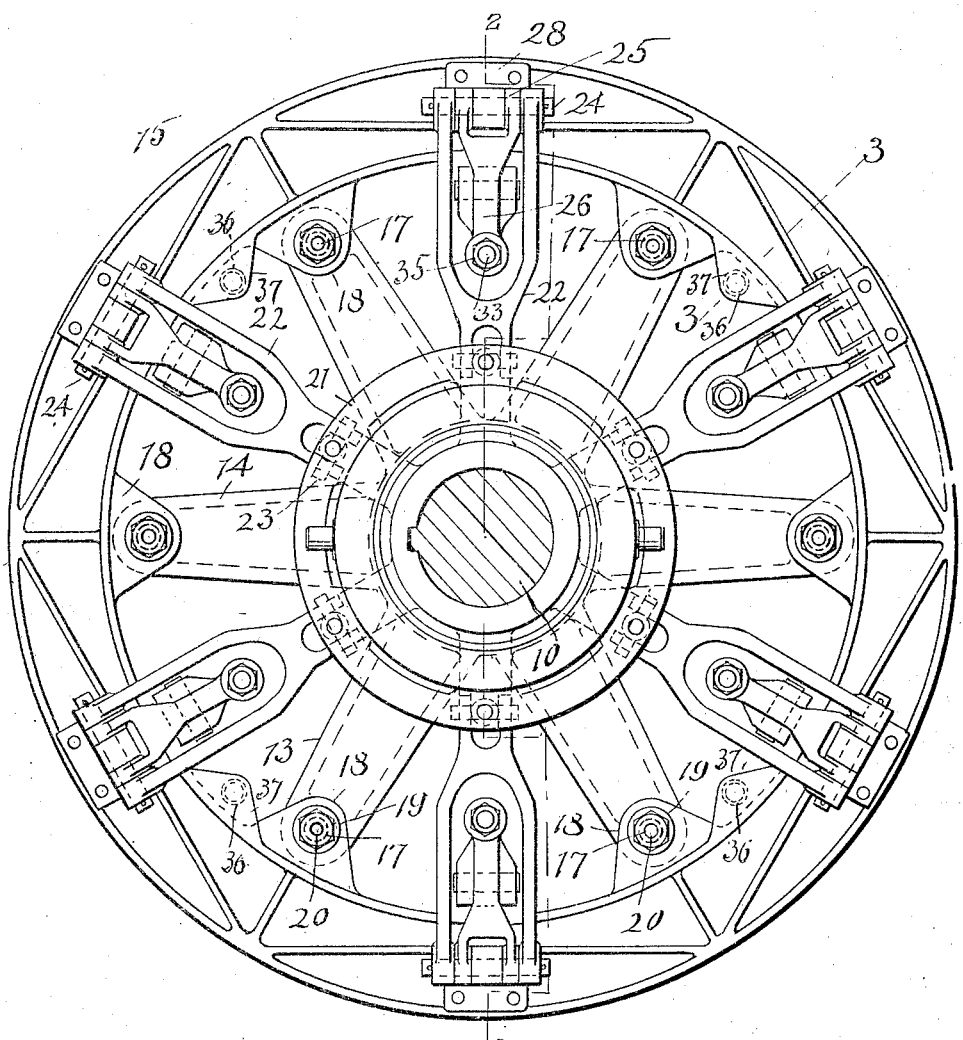
Figures 2, 3:
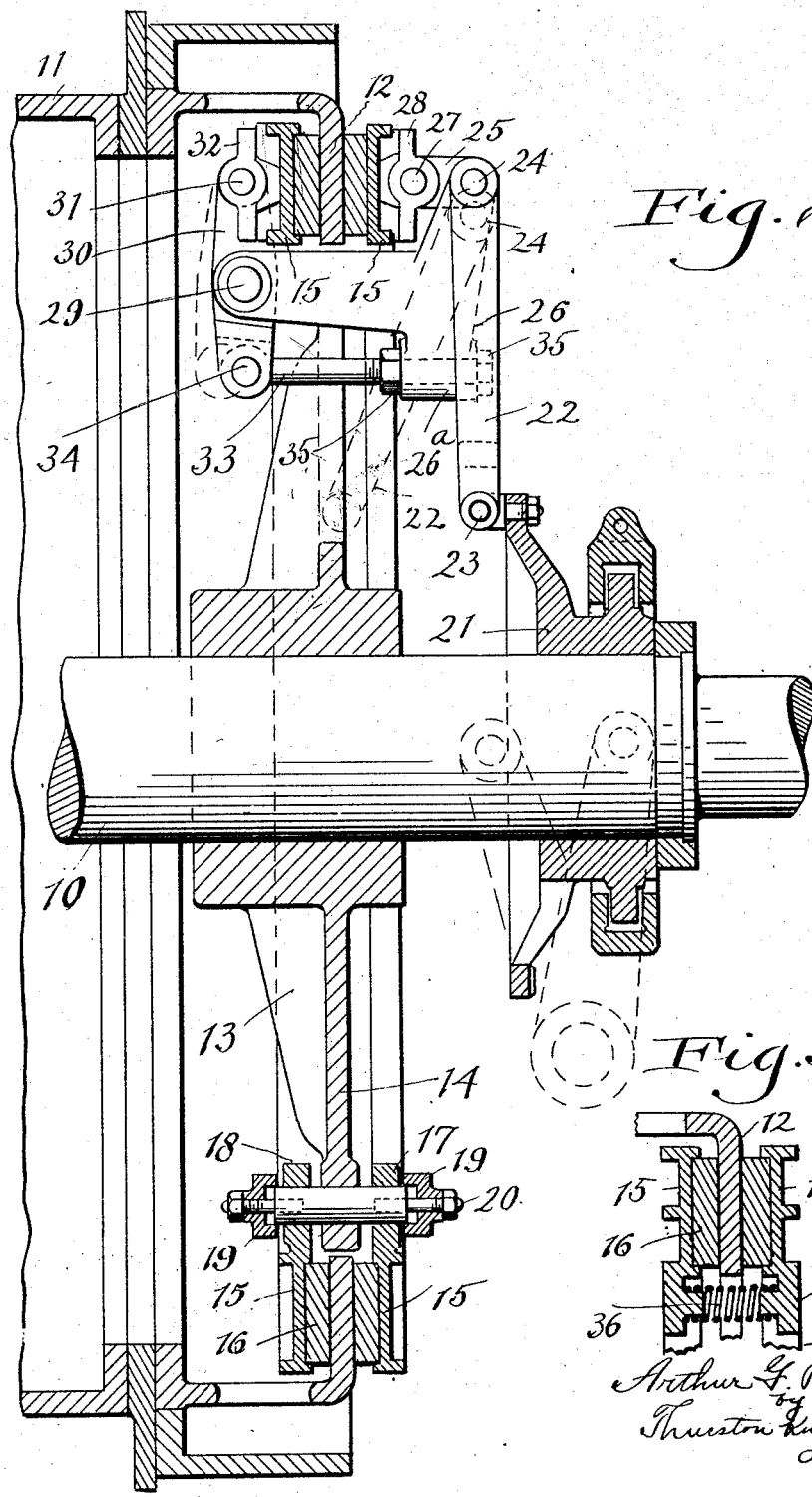

In the accompanying sheets of drawings wherein I have shown the preferred embodiment of the invention, Fig. 1 is a side view of my improved clutch; Fig. 2 is a vertical sectional view of the same on line 2—2 of Fig. 1 showing the clutch rings clutched to the flange of a drum; and Fig. 3 is a detail sectional view substantially along the line 3—3 of Fig. 1.

Referring now to the drawings, 10 represents the shaft on which the clutch is mounted, and 11 is a portion of a rope drum such as used with mine hoists, the drum being provided at one end with an inturned flange 12 adapted to be engaged by friction surfaces of the clutch rings which are located on opposite sides of the flange. Although my invention has particular utility for controlling the rope drum of a mine hoist, it is not necessarily confined to this particular use.

The clutch includes a clutch disk 13 in the form of a spider having an inner hub which is secured to the shaft, and a plurality of radial arms 14, which support two clutch rings 15 located as shown in Figs. 2 and 3, on opposite sides of the flange 12. The inner faces of these clutch rings are lined with suitable friction material 16 consisting preferably of blocks of wood or asbestos.

The rings 15 are connected to and supported by the spider or clutch disk 13 through the medium of horizontal pins 17 which pass through bosses at the outer ends of the arms 14 of the spider, and through lugs 18 on the inner periphery of the clutch rings. The clutch rings are capable of slight movement axially of these pins, the inward movement being limited by the engagement of the friction material 16 with opposite faces of the flange 12, and the outward movement which takes place when the clutch is released, being limited by adjustable stop collars 19 which are secured to opposite ends of the pins 17 by studs 20 (see lower part of Fig. 2).

The clutch is controlled by a sleeve 21, slidingly mounted on the shaft 10. Movement of this sleeve causes the actuation of a plurality of sets of clutch controlling toggle mechanisms, in this case, six in number, which toggle mechanisms are supported by, and float on the rings 15. Movement is transmitted from the sleeve 21 to these toggle mechanisms by forked arms 22, there being one such forked arm for each toggle mechanism, the sets of toggle mechanisms and movement transmitting arms 22 being equally spaced about the clutch. The inner ends of the arms 22 are pivotally connected to the sliding sleeve by pins 23, and their outer forked ends are each connected by a pin 24 to two parts 25 and 26 of a set of parts or elements which constitute one of the toggle mechanisms. The part 25 is a link which is connected by a pin 27 to a bracket 28, bolted or otherwise secured to the outer face of the outer clutch ring 15. The other part 26 is in the form of a substantially L-shaped toggle arm which extends radially inward from the pin 24, and then axially through the clutch inside the rings, its extreme end being connected by a pin 29 to substantially the middle point of a lever 30 which occupies a substantially radial position, and has its outer end connected by a pin 31 to a bracket 32 which is secured to the inner clutch ring 15, and is identical with the brackets 28 attached to the outer clutch ring 15. The arm 30 is held rigid or in fixed position with respect to the arm 26 by a bolt 33 which extends substantially horizontally. The inner end of the bolt is connected by a pin 34 to the lower or inner end of the arm 30, and this bolt also passes through a boss 26ᵃ at the inner part of the arm 26, and is locked in any adjusted position by a pair of nuts 35 screwed onto the bolt on opposite sides of the boss. It is apparent from the construction described, that the clutch can be adjusted by varying the position of the arm 30 with reference to the arm 26, simply by adjusting the nuts 35 which are located on the outer side of the clutch where access can be conveniently had to them.

The axes or centers of the pins 24, 27 and 31 form the three points of the toggle mechanism, and these three points are brought into alignment, or substantial alignment, and the clutch is therefore "in" when the parts are in their full line position shown in Fig. 2, i. e. when the forked arms 22 are substantially radial. But when the sleeve is moved inward toward the hub of the spider or clutch disk 13, so as to incline the forked arms 22 to the dotted line position shown in Fig. 2, the pin 24 is pulled inward out of alignment with the pins 27 and 31, causing the clutch to be thrown out. I prefer to employ a series of springs 36, (see Fig. 3) to assist the toggles in spreading the rings 15 when the clutch is thrown out. The springs as shown, are coil springs arranged at intervals around the clutch between inwardly extending lugs 37 on the clutch rings.

This clutch above described, has all the features and advantages stated in the objects of the invention expressed at the beginning of this specification, and in addition it has the features of ruggedness and durability, with a large factor of safety with respect to the clutch operating parts in the sense that the clutch is able to transmit the maximum load for which it is designed, even if one or more of the toggle mechanisms be rendered ineffective by breakage of any parts.

While I have shown the preferred construction, I do not desire to be confined to the exact details shown and described, but aim in my claims to cover all modifications which do not involve a departure from the spirit and scope of the invention as defined in the present claims.

Having described my invention, I claim:

1. In a clutch, an intermediate clutch member, an inner member adapted to be secured to a shaft, a pair of outer clutch rings supported by the inner member on opposite sides of the intermediate member and relatively movable toward and from one another, a plurality of sets of toggle mechanisms for shifting the rings relatively, each toggle mechanism comprising a link connected to one ring, and a toggle member pivotally connected to the link and extending through the rings to the opposite ring and pivotally connected thereto, said toggle member comprising a pair of relatively fixed but angularly adjustable parts and means for adjusting one part relative to the other to adjust the clutch.

2. In a clutch, an intermediate clutch member, a co-operating clutch mechanism comprising a pair of clutch rings movable toward and from one another on opposite sides of the intermediate clutch member, a plurality of sets of toggle mechanisms connected to and supported by the two clutch rings, each toggle mechanism comprising a link pivoted to the outer side of one of the rings, a rigid toggle member having outwardly extending end portions and an intermediate portion extending through the rings, one of said end portions being pivotally connected to the outer end of the link and the other being pivotally connected to the outer side of the other ring, and means connected to said links for simultaneously swinging them inwardly and outwardly to operate the clutch.

3. In a clutch, an intermediate clutch member, an inner member adapted to be mounted on a shaft, a pair of outer clutch rings movable toward and from one another and supported by said inner member on opposite sides of said clutch member, a plurality of sets of toggle mechanisms for shifting the rings, each toggle mechanism including a link pivotally connected to one ring, a second toggle link pivotally connected to the outer end of the link and extending inwardly and through the rings and pivotally connected to the opposite ring, and means connected to the links to swing them outward and inward, said toggle links being connected to the rings midway between the inner and outer edges thereof.

4. In combination with a shaft, an intermediate clutch member, a spider secured to the shaft, a pair of outer clutch rings supported by the spider and movable toward and from one another on opposite sides of the clutch member, a plurality of sets of toggles for shifting the rings to operate the clutch, each toggle mechanism including a link having its inner end pivotally connected to one ring, a toggle member extending through the rings and pivotally connected to the opposite ring, a shifter movable along the shaft, and a plurality of arms extending outwardly from the shifter to the different toggle mechanisms, each of said arms and the link and toggle member of the associated toggle mechanism being connected together at the pivot between the link and toggle member.

5. The combination with an intermediate clutch member, of a pair of clutch rings on opposite sides of said member and supported for movement toward and from one another, and a clutch operating mechanism, comprising a plurality of sets of toggle mechanisms, each toggle including a link having its inner end pivotally connected to one of the rings and a second toggle member pivoted to the outer end of the link and having a portion extending inwardly from the pivotal connection with the link, a portion extending laterally through the rings and an outwardly extending portion pivotally connected to the other ring, said outwardly extending portion of the toggle member being normally fixed but angularly adjustable with respect to the laterally extending portion, and means for operating said toggles.

6. The combination with an intermediate clutch member, of a pair of clutch rings on opposite sides of said member and supported for movement toward and from one another, and a clutch operating mechanism, comprising a plurality of sets of toggle mechanisms, each toggle including a link having its inner end pivotally connected to one of the rings and a second toggle member having an intermediate portion extending transversely through the rings, an end portion extending outwardly therefrom and pivotally connected to the outer end of the link and a portion projecting inwardly from the intermediate portion, a lever pivoted intermediate its ends to the other end of said intermediate portion, said lever being pivotally connected to the other ring, and a rigid adjustable connection between the inner end of said lever and the inwardly projecting portion, and means for operating said toggles.

In testimony whereof, I hereunto affix my signature.

ARTHUR G. REESE.